Feb. 7, 1950     W. J. HINCKS     2,496,394
TAIL-HIDE STRIPPING ASSEMBLY
Filed Aug. 25, 1948     4 Sheets-Sheet 1

Inventor:
William J. Hincks.
By: Fetherstonhaugh & Co
his Atty's.

Patented Feb. 7, 1950

2,496,394

UNITED STATES PATENT OFFICE 2,496,394

TAIL-HIDE STRIPPING ASSEMBLY

William J. Hincks, Norwood, Manitoba, Canada, assignor to Canada Packers Limited, St. Boniface, Manitoba, Canada Application August 25, 1948, Serial No. 46,082

13 Claims. (Cl. 17—21)

My invention relates to new and useful improvements in the art of skinning animals, more particularly with regard to the removal of the hide during the processing of animals in a packing plant, an object of the invention being to provide a device of the character herewithin described whereby the stripping of the hide from the tail may be facilitated particularly whilst the animal is on the conventional carcass rail.

A further object of my invention is to provide a device of the character herewithin described which is mounted upon a trolley, thereby permitting the hide to be stripped from the tail of an animal without the necessity for stopping the movement of the carcass rail.

Another object of my invention is to provide a device of the character herewithin described which may be operated mechanically, pneumatically or hydraulically.

A further object of my invention is to provide a device of the character herewithin described which permits ready attachment and detachment of the hide to and from the stripping unit, thereby materially increasing the rate of processing of the animal.

A still further object of my invention is to provide a device of the character herewithin described whereby the processing of animals may be facilitated, at the same time relieving the operator of considerable physical strain.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings, in which.

In the drawings like characters of reference indicate corresponding parts in the different figures.

The processing of animals in the meat packing industry entails the removal of the hide which is normally carried out while the animal is on the floor or in the half hoisted position. The majority of the hide is removed by the use of skinning knives but these are not very practicable for the stripping of the hide surrounding the tail cartilage. It will be appreciated that, due to the relatively small diameter and bony construction of the tail cartilage, it is only possible to make a longitudinal incision of the hide, which then has to be stripped from the cartilage manually, and it will be appreciated that this operation requires considerable force to be exerted by the operator as the adhesion of the hide to the cartilage is substantial.

Consequently I have designed the device hereinafter to be described whereby the hide may be stripped from the tail cartilage mechanically, it being only necessary to make a small incision at the distal end thereof in order that the hide may be attached to the machine.

Figure 1:
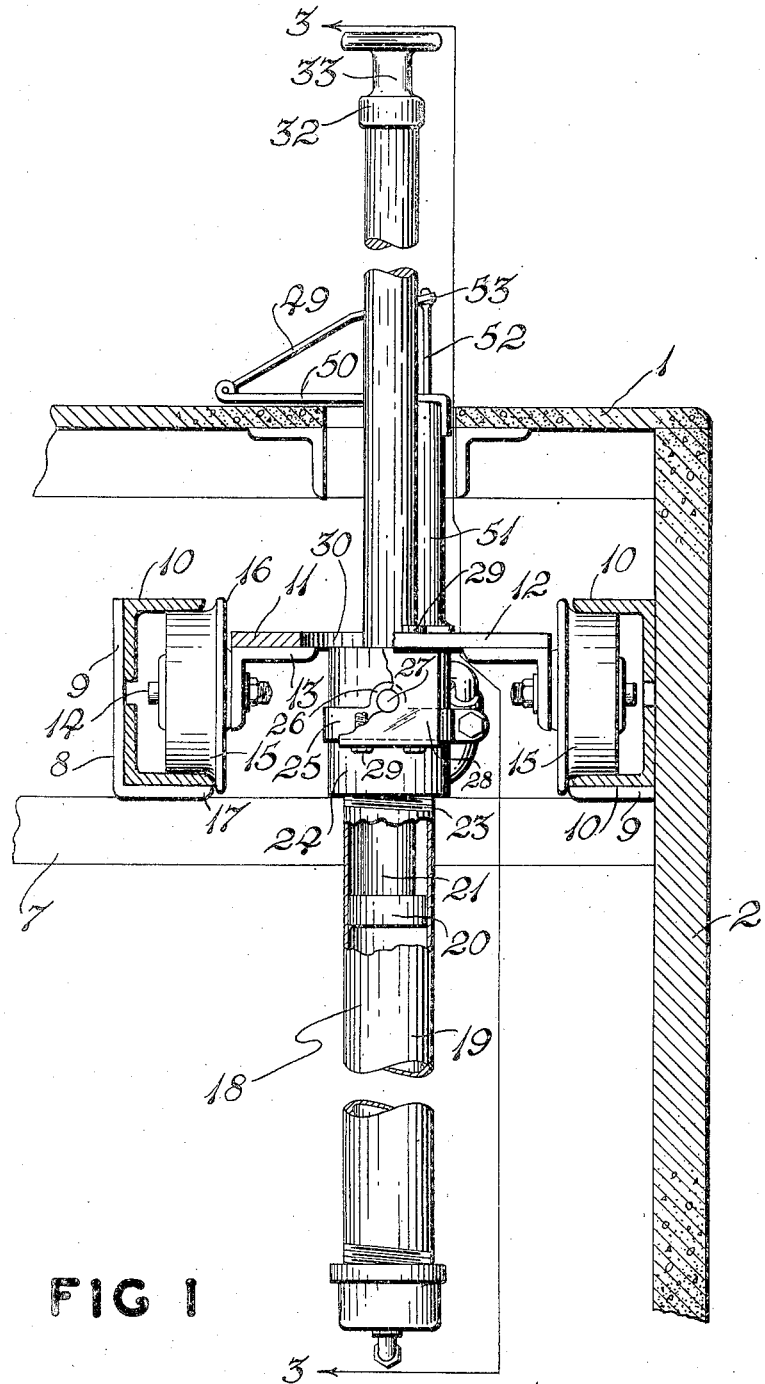
Figure 1 is an end view of my device with the flooring sectioned to show the location of the trolley.
Figure 2:
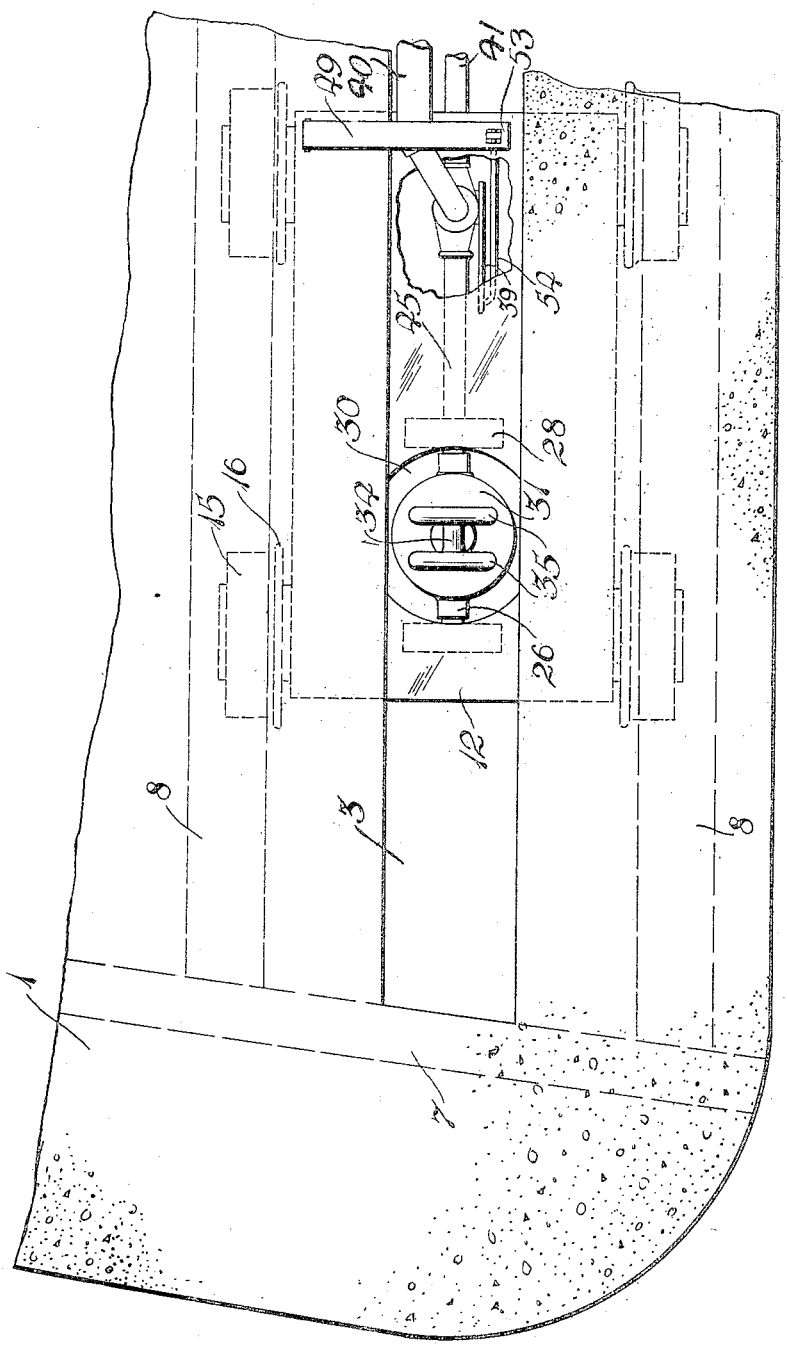
Figure 2 is a top plan view of my device.

Proceeding now to describe my invention in detail, it will be seen by reference to the accompanying drawings that the elevated flooring 1, supported by the side walls 2, is provided with the elongated aperture or slot 3 extending longitudinally and substantially parallel to the carcass rail 4, the elevated structure being necessary in order to bring the tail 5 of the animal 6 within easy reach of the operator. Subjacent the elevated flooring 1 and spanning the structure therebelow, adjacent the ends of the slot 3, are the transverse bracings 7 (one only of which is shown in the drawings), acting as supports for the trolley rails 8 which are spaced below and parallel to the slot 3. These rails include the main channel members 9 to which are rigidly attached internally the two angle iron members 10 forming the tracks for the trolley or carriage collectively designated 11 as clearly shown in Figure 1 of the accompanying drawings.

The trolley comprises the rectangular table 12 supported by the two longitudinal angle irons 13 to which are bolted the stub axles 14 carrying the wheels 15. These wheels are provided with the flanges 16 which, in conjunction with the inboard ends 17 of the aforementioned channels 9, limit the transverse movement of the trolley.

The tail hide stripping assembly collectively designated 18 comprises the cylinder 19, the piston 20, capable of reciprocation therein, the elongated piston rod 21 and the fluid control assembly collectively designated 22. The cylinder, which is situated vertically below the aforementioned trolley 11, is provided with the external screw threads 23 at the uppermost end thereof by which it is engageable within the cylinder head 24. The head, which is also of cylindrical configuration, is encircled by the split collar 25 provided with the two diametrically disposed shoulders 26. The gudgeon pins 27 extend outwardly from these shoulders and are rotatably supported within the bearing blocks 28 which depend from the underside of the aforementioned trolley table 12 being attached thereto by means of the bolts 29.

The circular aperture 30 in the aforementioned trolley table 12 superjacent the cylinder 19, permits limited oscillation of the cylinder transversely with relation to the trolley, via the gudgeon pins 27 and the bearing blocks 28, for the purpose hereinafter to be explained. Attached to the piston 20 and extending upwardly therefrom is the elongated piston rod 21 which passes through a sealing gland (not illustrated) in the uppermost face 31 of the cylinder head 24, and extends through the aperture 30 and aforementioned elongated slot 3. Adjacently attached to the uppermost end of this piston rod is the snubbing block assembly collectively designated 32 including the thimble portion 33, (which may be screw-threadedly attached to the piston rod) surmounted by the diametrically disposed crosspiece 34. Formed on the extremities of the cross piece and at right angles thereto, is the parallel pair of guide prongs 35 which facilitates the attachment of the manually stripped portion 36 of the tail hide as will hereinafter be explained.

Figure 3:
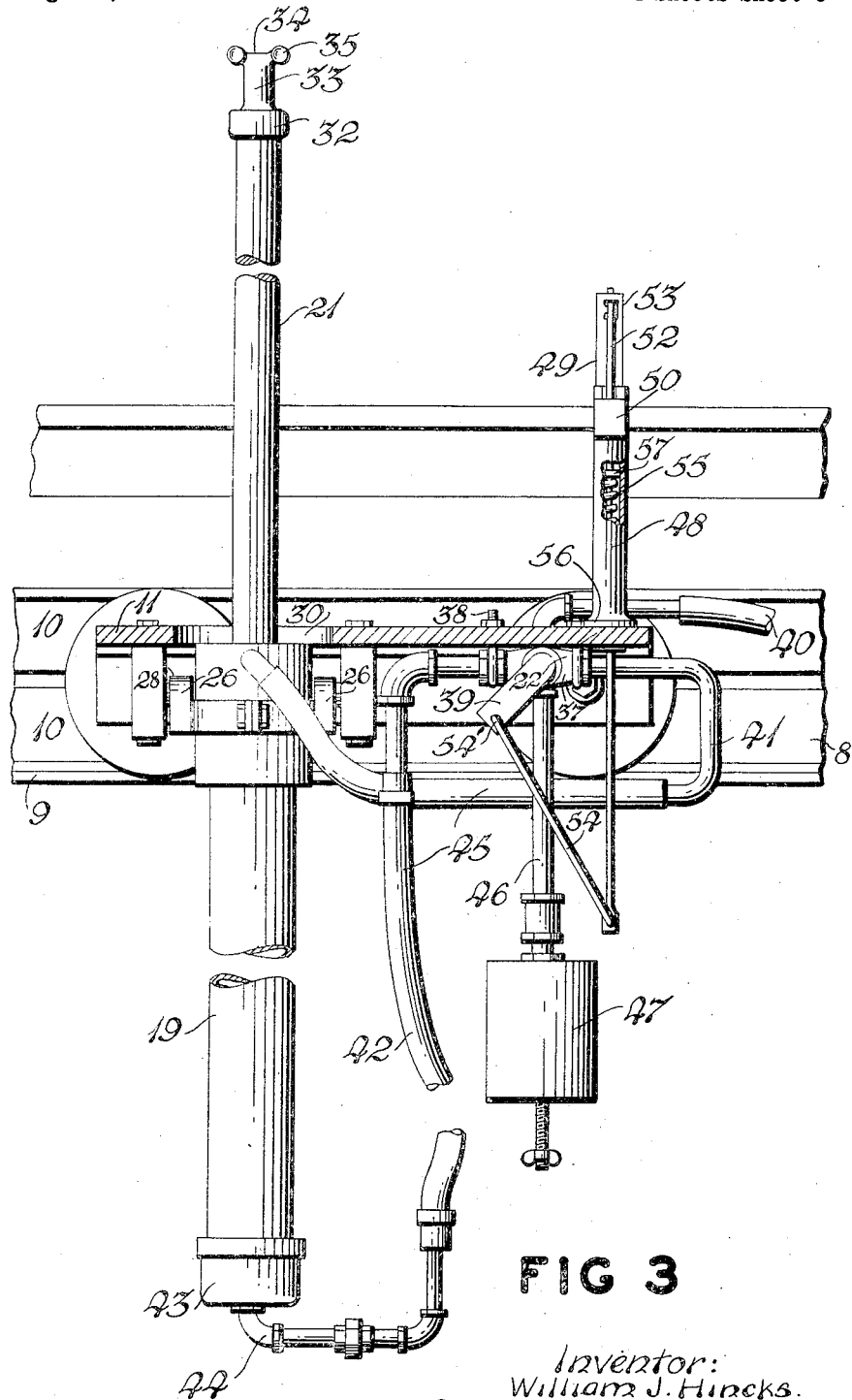
Figure 3 is a view of my device taken along the lines 3—3 of Figure 1.

Reciprocation of the aforementioned piston 20 and piston rod 21 is controlled by means of the valve assembly 22 which is situated substantially towards the opposite end of the trolley table 12 and is clearly shown in Figure 3 of the accompanying drawings.

This assembly comprises the two-way valve 37 attached to the under side of the trolley table by means of the U-bolts 38 and actuated by the lever arm 39 which selects the route of the fluid, entering from a main source of supply to the conduit 41, into the cylinder head 24 above the upper piston stroke limit, or via the conduit 42 to below the piston 20 depending upon whether it is desired to raise or lower the piston rod 21. It will be noted that the cylinder 19 is provided with the screw-threaded lower cap 43 to which the aforementioned conduit 42 is connected by means of a suitable union 44. It will also be observed that the aforementioned conduits 41 and 42 are provided with the flexible sections 45 in order to permit the aforementioned limited oscillation of the cylinder unit.

Whether the piston is moving upwardly or downwardly, the fluid displaced from the leading side of the piston will be routed to the valve via the idle conduit, from whence it passes through the outlet conduit 46. This embodiment illustrates an assembly designed to be actuated pneumatically, and the outlet conduit 46 is provided with the adjustable exhaust dampener unit 47 of conventional construction whereby the velocity of the piston is controlled.

This control is desirable as the piston moving upwardly is under a condition of least load or resistance and the full air pressure from the main supply line 40 will be acting on the underside thereof. With no dampener unit fitted, the piston would strike the cylinder head with considerable force with the subsequent possibility of fracture. The dampener unit 47 restricts the displacement of air from the leading side of the piston to atmosphere, thereby limiting the linear velocity of the assembly.

The valve 37 is actuated by the spring loaded foot pedal assembly 48 comprising the foot pedal 49 pivotally attached at one end thereof to the pedal support bracket 50 which spans the aforementioned slot 3 slightly above the elevated flooring 1, and is welded to the top of the upstanding spring carrying cylinder 51.

The cylinder is rigidly attached to the aforementioned trolley table 12 and extends to a position flush with the aforementioned elevated flooring 1 registering with the slot 3. The vertical connecting rod 52 extends from the opposite end 53 of the foot pedal 49 downwardly through the cylinder 48 below the floor of the trolley 12 and pivotally connects with the diagonal link rod 54. The opposite end 54' of the link rod is attached to the lever arm 39 of the valve 37 which is actuated thereby in order to control the routing of the fluid as hereinbefore described. The extension coil spring 55 is mounted coaxially upon the vertical connecting rod 52 within the cylinder 48 and reacts between the collar 57 (rigidly attached to the aforementioned vertical rod 52) and the base of the cylinder in order to maintain the pedal normally in the raised position.

Having described my invention in detail, its method of operation will now be presented.

The animal being processed is attached to the main carcass rail 4 by means of the hook 58 engaging with the ham string bone of the hind legs 59, and is moving slowly along the carcass rail 4 parallel with the aforementioned slotted elevator floor 1. In parallel spaced relation to the rail is the subrail 69 extending longitudinally for a distance approximately equal to the length of the slot 3, and carrying the tail cartilage clamp 70 attached to the wheeled bogey 71 by means of the chain 72. The tail hide 36 is stripped back manually from the distal end 73 of the tail, thereby exposing the cartilage 74 which is inserted within the pair of tail cartilage gripping jaws 75 of the clamp. Movement of the lever 76 closes the jaws thereby gripping the cartilage firmly therebetween. The manually stripped hide 36 is passed between the pair of parallel guide prongs 35 on the uppermost end of the aforementioned piston rod 21, around the thimble portion 33 and thence between the thimble and itself in the form of a half hitch as clearly shown in the Figure 4 of the accompanying drawings.

Figure 4:
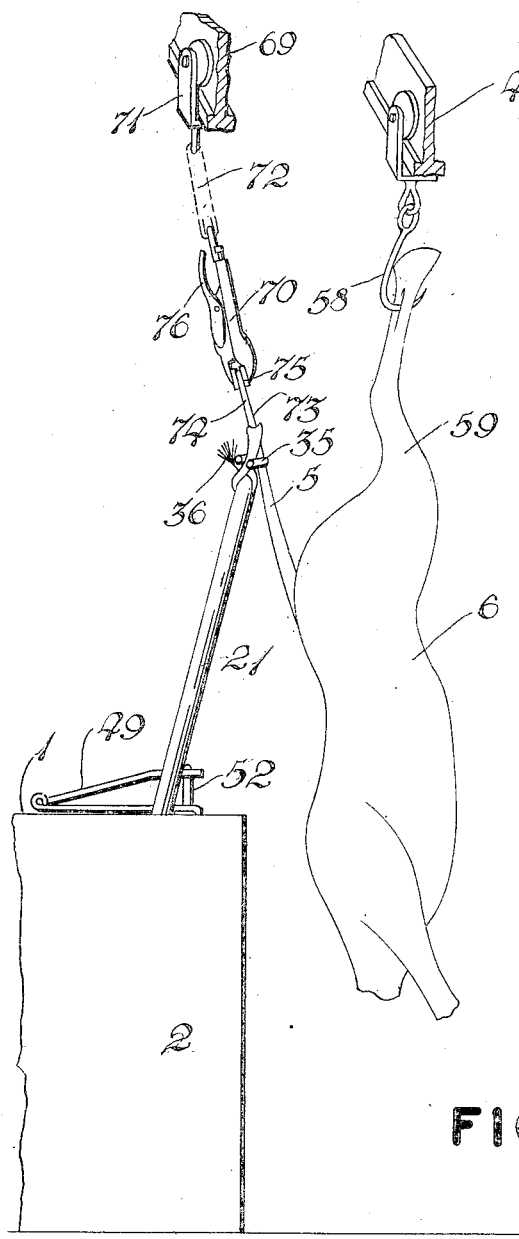
Figure 4 is a perspective representation of my device showing the method of attachment of the tail hide to the snubbing block.

The guide prongs 35 assist in maintaining the stripped portion of the hide in alignment with the tail stripping assembly in order to avoid transverse tearing occurring as it will be appreciated that the trolley will be pulled along the tracks 10 by the movement of the animal upon the carcass rail 4. The tail stripping assembly inclines towards the animal as illustrated in Figure 4, pivoting around the aforementioned gudgeon pin 27, clearance for the piston rod being provided by the aperture 30 within the trolley table 12 and slot 3 within the elevated floor 1. The pedal 49 is now depressed, actuating the valve 37 which causes fluid to flow to the upper side of the piston 29. The piston, together with the rod 21, moves downwardly thus stripping the hide from the tail cartilage which is maintained in position by the clamp 70. When pressure is removed from the foot pedal, the spring 55 returns the pedal to the normal position, thereby actuating the valve and changing the direction of the fluid flow to the underside of piston 20 which causes the piston together with the piston rod to return to the raised position whereupon the tail hide may be disconnected from the snubbing block 32.

During this process the animal has continued to travel along the carcass rail moving the stripping assembly and the trolley therewith. After disengagement of the tail hide and the tail cartilage the trolley is moved manually towards the opposite end of the track ready for the next animal which will be approaching the elevated flooring.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In the art of skinning beef cattle, means for stripping the tail-hide from the tail-cartilage while the latter hangs vertically from the distal end thereof, which consists in the combination of a tail-cartilage clamp assembly suspended from the conventional carcass rail, and a tail-hide stripping assembly, said first assembly comprising a carcass-rail trolley, a pair of downwardly projecting tail-cartilage gripping jaws connected thereto and a jaw opening and closing action, said tail-hide stripping assembly comprising an elongated member attachable at one end thereof to a manually stripped piece of hide from the distal end of the tail, and means for effecting relative movement as between said jaws and said elongated member at the point of attachment thereof to said piece of hide so that the tail-hide is stripped from the tail cartilage downwardly as the latter moves horizontally.

2. In the art of skinning beef cattle, and in association with a source of power means for stripping the tail-hide from the tail-cartilage while the latter hangs vertically from the distal end thereof, which consists in the combination of a tail-cartilage clamp assembly suspended from the conventional carcass-rail, and a tail-hide stripping assembly, said first assembly comprising a carcass-rail trolley, a pair of downwardly projecting tail-cartilage gripping jaws connected thereto and a jaw opening and closing action, said tail-hide stripping assembly comprising an elongated member attachable at one end thereof to a manually stripped piece of hide from the distal end of the tail, and means for effecting downwardly linear movement of said elongated member so that the tail-hide is stripped from the tail-cartilage downwardly as the latter moves horizontally.

3. In the art of skinning beef cattle, and in association with a source of power means for stripping the tail-hide from the tail cartilage while the latter hangs vertically from the distal end thereof, which consists in the combination of a tail-cartilage clamp suspended from the conventional carcass-rail, and a tail-hide stripping assembly, said first assembly comprising a carcass-rail trolley, a pair of downwardly projecting tail cartilage gripping jaws connected thereto, together with a jaw opening and closing action, said tail-hide stripping assembly comprising in operative association, a rigid elongated member, guide means in which said member may be caused to move endwise and substantially vertically, means on one end of said member for attaching thereto a manually stripped piece of hide from the distal end of the tail, and means for selectively controlling the aforesaid movement of said member.

4. In the art of skinning beef cattle and in association with a source of power means for stripping the tail hide from the tail cartilage while the latter hangs vertically from the distal end thereof, which consists in the combination of a tail-cartilage clamp assembly suspended from the conventional carcass-rail, a tail-hide stripping assembly, and a rail mounted carriage for the latter, said first assembly comprising a carcass-rail trolley, a pair of tail-cartilage gripping jaws connected thereto, and a jaw opening and closing action, said tail-hide stripping assembly comprising in operative association, a rigid elongated member, guide means in which said member may be caused to move endwise and substantially vertically, means on one end of said member for attaching thereto a manually stripped piece of hide from the distal end of the tail, said stripping assembly being mounted for movement upon and with said carriage, and means for selectively controlling the aforesaid movement of said member.

5. In the art of skinning beef cattle, and in association with a source of power an assembly for stripping the hide of the tail from the cartilage while the animal is suspended by the hind legs from and travelling along a rail, and while the tail hangs vertically from the distal end thereof, comprising in combination with a floor, slotted in the direction of travel of the animal when so suspended, and a pair of rails spaced below said floor parallel with said slot, one rail being on either side thereof, a carriage mounted for travel upon said rail, a substantially vertical cylinder mounted upon said carriage, a piston in said cylinder, a piston rod secured to said piston, means for securing a manually stripped piece of hide from the distal end of the tail to the end of said rod remote from said piston, a two-way valve in communication with the associated source of power, conduits communicating between said valve and said cylinder on either side of the piston stroke limits, valve actuating means connected thereto and extending above the level of said floor, said valve actuating means travelling with said carriage, and a tail cartilage clamp assembly including a carcass-rail trolley from which said clamp is suspended, said clamp gripping the distal end of the tail cartilage while the hide is being stripped downwardly therefrom against the effort exerted by said piston rod in so doing.

6. In the art of skinning beef cattle, and in association with a source of power, an assembly for stripping the hide of the tail from the cartilage while the animal is suspended by the hind legs from and travelling along a rail, and while the tail hangs vertically from the distal end thereof, comprising in combination a rail-mounted carriage movable in the direction of the animal upon the rail, a substantially vertical cylinder mounted upon said carriage, a piston in said cylinder, a piston rod secured to said piston, means for securing a manually stripped piece of hide from the distal end of the tail to the end of said rod remote from said piston, a two-way valve in communication with the associated source of power, conduits communicating between said valve and said cylinder on either side of the piston stroke limits, valve actuating means connected thereto, said valve actuating means travelling with said carriage, and a tail cartilage clamp assembly including a carcass-rail trolley from which said clamp is suspended, said clamp gripping the distal end of the tail cartilage while the hide is being stripped downwardly therefrom against the effort exerted by said piston rod in so doing.

7. In the art of skinning beef cattle, and in association with a source of power an assembly for stripping the hide of the tail from the cartilage while the animal is suspended by the hind legs from and travelling along a rail, and while the tail hangs vertically from the distal end thereof, comprising in combination with a floor, slotted in the direction of travel of the animal when so suspended, a rail-mounted carriage below said floor, a tail-hide stripping assembly mounted upon said carriage, and a tail-cartilage clamp assembly mounted upon said carcass-rail, said stripping assembly consisting of a substantially vertical cylinder journalled upon said carriage for limited oscillation from the vertical, a piston in said cylinder, a piston rod secured to said piston, means for securing a manually stripped piece of hide from the distal end of the tail to the end of said rod remote from said piston, a two-way valve in communication with the associated source of power, conduits communicating between said valve and said cylinder on either side of the piston stroke limits, valve actuating means connected thereto and extending above the level of said floor, said valve actuating means travelling with said carriage, said tail cartilage clamp assembly including a carcass-rail trolley from which said clamp is suspended, said clamp gripping the distal end of the tail cartilage while the hide is being stripped downwardly therefrom against the effort exerted by said piston rod in so doing.

8. In the art of skinning beef cattle, and in association with a source of power an assembly for stripping the hide of the tail from the cartilage while the animal is suspended by the hind legs from and travelling along a rail, and while the tail hangs vertically from the distal end thereof, comprising in combination with a floor, slotted in the direction of travel of the animal when so suspended, a rail-mounted carriage below said floor, a tail-hide stripping assembly mounted upon said carcass-rail, said stripping assembly consisting of a substantially vertical cylinder, journalled upon said carriage for limited oscillation from the vertical in a plane at right angles to the direction of the carriage, a piston in said cylinder, a piston rod secured to said piston, means for securing a manually stripped piece of hide from the distal end of the tail to the end of said rod remote from said piston, a two-way valve in communication with the associated source of power, conduits communicating between said valve and said cylinder on either side of the piston stroke limits, valve actuating means connected thereto and extending above the level of said floor, said valve actuating means travelling with said carriage, and a tail cartilage clamp assembly including a carcass-rail trolley from which said clamp is suspended, said clamp gripping the distal end of the tail cartilage while the hide is being stripped downwardly therefrom against the effort exerted by said piston rod in so doing.

9. In the art of skinning beef cattle, and in association with a source of power an assembly for stripping the hide of the tail from the cartilage while the animal is suspended by the hind legs from and travelling along a rail, and while the tail hangs vertically from the distal end thereof, comprising in combination with a floor, slotted in the direction of travel of the animal when so suspended, and a pair of rails spaced below said floor parallel with said slot, one rail being on either side thereof, a carriage mounted for travel upon said rails, a substantially vertical cylinder journalled upon said carriage for limited oscillation from the vertical, a piston in said cylinder, a piston rod secured to said piston, means for securing a manually stripped piece of hide from the distal end of the tail to the end of said rod remote from said piston, a two-way valve in communication with the associated source of power, conduits communicating between said valve and said cylinder on either side of the piston stroke limits, valve actuating means connected thereto and extending above the level of said floor, said valve actuating means travelling with said carriage, and a tail cartilage clamp assembly including a carcass-rail trolley from which said clamp is suspended, said clamp gripping the distal end of the tail cartilage while the hide is being stripped downwardly therefrom against the effort exerted by said piston rod in so doing.

10. In the art of skinning beef cattle, and in combination with a source of power an assembly for stripping the hide of the tail from the cartilage while the animal is suspended by the hind legs from and travelling along a rail, and while the tail hangs vertically from the distal end thereof, comprising in combination with a floor, slotted in the direction of travel of the animal when so suspended, and a pair of rails spaced below said floor parallel with said slot, one rail being on either side thereof, a carriage mounted for travel upon said rails, a substantially vertical cylinder journalled upon said carriage for limited oscillation from the vertical in a plane at right angles to the direction of travel, a piston in said cylinder, a piston rod secured to said piston, means for securing a manually stripped piece of hide from the distal end of the tail to the end of said rod remote from said piston, a two-way valve in communication with the associated source of power, conduits communicating between said valve and said cylinder on either side of the piston stroke limits, valve actuating means connected thereto and extending above the level of said floor, said valve actuating means travelling with said carriage, and a tail cartilage clamp assembly including a carcass-rail trolley from which said clamp is suspended, said clamp gripping the distal end of the tail cartilage while the hide is being stripped downwardly therefrom against the effort exerted by said piston rod in so doing.

11. In the tail-hide stripping assembly according to claim 1, the means for attaching the manually stripped-off hide therein referred to, to said elongated member which consists of a snubbing block formed of a thimble portion around which the stripped off piece of hide may be tied, a diametrically disposed cross-piece connected thereto, and a pair of parallel guide prongs secured to the ends of said cross-piece functioning in the manner herein specified.

12. In the tail-hide stripping assembly according to claim 6, the means for attaching the manually stripped-off hide therein referred to, to said elongated member which consists of a snubbing block formed of a thimble portion around which the stripped off piece of hide may be tied, a diametrically disposed cross-piece connected thereto, and a pair of parallel guide prongs secured to the ends of said cross-piece functioning in the manner herein specified.

13. In the tail-hide stripping assembly according to claim 8, the means for attaching the manually stripped-off hide therein referred to, to said elongated member which consists of a snubbing block formed of a thimble portion around which the stripped off piece of hide may be tied, a diametrically disposed cross-piece connected thereto, and a pair of parallel guide prongs secured to the ends of said cross-piece functioning in the manner herein specified.

WILLIAM J. HINCKS.

No references cited.